US009567552B2

(12) United States Patent
Olson et al.

(10) Patent No.: US 9,567,552 B2

(45) **Date of Patent: *Feb. 14, 2017**

(54) HIGH MOLECULAR WEIGHT POLYACRYLATES FOR ALUMINUM PROTECTION IN WAREWASH APPLICATIONS

(71) Applicant: Ecolab USA Inc., St. Paul, MN (US)

(72) Inventors: Erik C. Olson, Savage, MN (US); Devon Beau Hammel, Minneapolis, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/678,042

(22) Filed: Apr. 3, 2015

(65) Prior Publication Data

US 2015/0210962 A1 Jul. 30, 2015

Related U.S. Application Data

(63) Continuation of application No. 14/183,035, filed on Feb. 18, 2014, now Pat. No. 9,029,314, which is a continuation of application No. 12/869,815, filed on Aug. 27, 2010, now Pat. No. 8,691,018.

(51) Int. Cl.

| | |
|---|---|
| ***C11D 1/00*** | (2006.01) |
| ***C11D 3/40*** | (2006.01) |
| ***C11D 3/50*** | (2006.01) |
| ***B08B 3/04*** | (2006.01) |
| ***C11D 3/37*** | (2006.01) |
| ***C08F 120/06*** | (2006.01) |
| ***C11D 3/00*** | (2006.01) |
| ***C11D 3/04*** | (2006.01) |
| ***C11D 17/00*** | (2006.01) |
| ***C11D 3/08*** | (2006.01) |
| ***C11D 11/00*** | (2006.01) |

(52) U.S. Cl.

CPC ............... *C11D 3/3757* (2013.01); *B08B 3/04* (2013.01); *C08F 120/06* (2013.01); *C11D 1/00* (2013.01); *C11D 3/0073* (2013.01); *C11D 3/0084* (2013.01); *C11D 3/044* (2013.01); *C11D 3/08* (2013.01); *C11D 3/40* (2013.01); *C11D 3/50* (2013.01); *C11D 11/0029* (2013.01); *C11D 17/0056* (2013.01)

(58) Field of Classification Search

CPC ......... C11D 1/00; C11D 3/044; C11D 3/3757; C11D 3/40; C11D 3/50; B08B 3/04

See application file for complete search history.

(56) References Cited

U.S. PATENT DOCUMENTS

| | | | | |
|---|---|---|---|---|
| 601,723 | A | 4/1898 | Werts | |
| 4,834,955 | A | 5/1989 | Mouche et al. | |
| 5,320,771 | A | 6/1994 | Turcotte et al. | |
| 5,389,276 | A * | 2/1995 | Coffey et al. | 252/70 |
| 5,431,847 | A | 7/1995 | Winston et al. | |
| 5,510,048 | A * | 4/1996 | Durbut et al. | 510/223 |
| 5,801,137 | A * | 9/1998 | Addison et al. | 510/228 |
| 6,087,313 | A * | 7/2000 | Ardia | C11D 11/0017 510/283 |
| 6,686,325 | B2 | 2/2004 | Hoyt et al. | |
| 6,812,194 | B2 | 11/2004 | Ruhr et al. | |
| 7,524,535 | B2 | 4/2009 | Kim et al. | |
| 7,524,803 | B2 | 4/2009 | Lentsch et al. | |
| 7,601,280 | B2 | 10/2009 | Kinlen | |
| 7,601,425 | B2 | 10/2009 | Stoffer et al. | |
| 7,638,473 | B2 | 12/2009 | Smith et al. | |
| 7,655,279 | B2 | 2/2010 | Dietsche et al. | |
| 7,662,241 | B2 | 2/2010 | Sinko | |
| 7,727,420 | B2 | 6/2010 | Ward | |
| 8,263,540 | B2 * | 9/2012 | Olson et al. | 510/245 |
| 8,480,808 | B2 * | 7/2013 | Olson et al. | 134/2 |
| 8,691,018 | B2 * | 4/2014 | Olson et al. | 134/2 |
| 9,029,314 | B2 * | 5/2015 | Olson et al. | 510/476 |
| 2003/0109394 | A1 | 6/2003 | Ruhr et al. | |
| 2003/0176305 | A1 | 9/2003 | Hoyt et al. | |
| 2008/0233390 | A1 | 9/2008 | Gothlich et al. | |
| 2008/0287335 | A1 * | 11/2008 | Smith | 510/220 |
| 2009/0029155 | A1 | 1/2009 | Gothlich et al. | |

(Continued)

FOREIGN PATENT DOCUMENTS

| | | | | |
|---|---|---|---|---|
| WO | 0105931 | | 1/2001 | |
| WO | WO 01/05931 | * | 1/2001 | C11D 17/00 |
| WO | 2004020562 | | 3/2004 | |

OTHER PUBLICATIONS

ACUMER1510 Polyacrylic Acid Homopolymer, http://www.rohmhaas.com/wcm/products/product_detail.page?product=1121949&display . . . DOW, 2 pages printed Internet May 10, 2010, May 10, 2010.

Amin, Mohammed A. et al., "Polyacrylic acid as a corrosion inhibitor for aluminium in weakly alkaline solutions. Part I: Weight loss, polarization, impedance EFM and EDX studies", Corrosion Science 51 (2009) 658-667. Dec. 31, 2009.

Kelien Water Treatment Chemicals, "Maleic acid/acrylic acid copolymer (MA/AA)", http://www.kelien.comlproducts/MA-AA%20COPOLYMER.htm, 1 page, printed Internet May 10, 2010.

(Continued)

*Primary Examiner* — Brian P Mruk

(74) *Attorney, Agent, or Firm* — McKee, Voorhees and Sease, PLC

(57) ABSTRACT

A warewashing detergent composition is provided for use for in cleaning of alkaline sensitive metals such as aluminum or aluminum containing alloys. The compositions include alternatives to sodium tripolyphosphate and/or other phosphorous containing raw materials, while retaining cleaning performance and corrosion prevention. According to the invention, high molecular weight polyacrylates (polyacrylic acid homopolymers) with a molecular weight of at least about 5000 are used as corrosion inhibitors and can be included for aluminum protection in a number of different detergent compositions.

11 Claims, No Drawings

(56) References Cited

U.S. PATENT DOCUMENTS

| | | | | |
|---|---|---|---|---|
| 2009/0176685 | A1 | 7/2009 | Ward | |
| 2010/0298193 | A1* | 11/2010 | Tjelta et al. | 510/224 |
| 2010/0300493 | A1 | 12/2010 | Snodgrass et al. | |

OTHER PUBLICATIONS

Akzo Nobel Surface Chemistry LLC, "Technical Information Surface Chemistry" Aquatreat® Products Polymer Selection Guide, http://surface.akzonobel.com, 2009, 3 pages. Dec. 31, 2009.

Rohm and Haas, "ACUSOL™ 445/445N/445ND Detergent Polymer for Laundry", 3 pages, Dec. 31, 2008.

Rohm and Haas, "ACUMER™ 1510 Polyacrylic Acid Homopolymer", 3 pages, Dec. 31, 2008.

Bwa Water Additives, Waterfront™ Product Information, Belclene®—the industry Standard Antiscalant for Calcium Carbonate Control in Severe Service Conditions, www.wateradditives.com, 2006, 2 pages. Dec. 31, 2006.

International Search Authority, "International Search Report and the Written Opinion" issued in connection with International Application No. PCT/IB2011/053741 mailed on May 30, 2012.

* cited by examiner

HIGH MOLECULAR WEIGHT POLYACRYLATES FOR ALUMINUM PROTECTION IN WAREWASH APPLICATIONS

CROSS-REFERENCE TO RELATED APPLICATIONS

This is a Continuation Application of U.S. Ser. No. 14/183,035 filed Feb. 18, 2014, now U.S. Pat. No. 9,029, 314, which is a Continuation Application of U.S. Ser. No. 12/869,815 filed Aug. 27, 2010, now U.S. Pat. No. 8,691, 018 on Apr. 8, 2014, all of which are herein incorporated by reference in their entirety.

FIELD OF THE INVENTION

The invention relates to corrosion inhibiting compositions and detergent and cleaning compositions incorporating the same, particularly warewashing compositions comprising polyacrylates (or polyacrylic acid), and their use for cleaning of alkaline sensitive metals such as aluminum or aluminum containing alloys.

BACKGROUND OF THE INVENTION

In recent years there has been an ever increasing trend towards safer and sustainable detergent compositions. This has led to the development of alternative complexing agents, builders, threshold agents, corrosion inhibitors, and the like, which are used instead of predominantly phosphorous containing compounds. Phosphates can bind calcium and magnesium ions, provide alkalinity, act as threshold agents, and protect alkaline sensitive metals such as aluminum and aluminum containing alloys.

Other corrosion inhibitors include silicates, such as, sodium silicate. Sodium silicate has a tendency to begin precipitating from aqueous solution at a pH below 11, thus reducing its effectiveness to prevent corrosion of the contacted surfaces when used in cleaning solutions having a lower pH. Additionally, when allowed to dry on a surface silicates form films and/or spots which are visible and themselves are very difficult to remove. The presence of these silicon containing deposits can affect the texture, appearance and on cooking or storage surfaces the taste of the materials that come into contact with the cleaned surfaces.

It is an object of the invention to address at least one of the above problems and/or to offer detergent compositions with usage and/or environmental benefits.

SUMMARY OF THE INVENTION

The discovery that using high molecular weight polyacrylates, namely those with molecular weights of 5000 or above and ideally those with molecular weights of 10,000 or above, can achieve corrosion protection for Aluminum and aluminum containing alloys.

In one embodiment, the present invention relates to a corrosion inhibiting composition that may be used in formulation of detergents, cleaning compositions, and in protecting aluminum and aluminum containing alloys from corrosion. The corrosion inhibiting composition comprises the use of high molecular weight polyacrylates, (or polyacrylic acid homopolymers). The polyacrylates (or polyacrylic acid homopolymer) or combination of the same preferably includes those with a molecular weight of 5000 or above, more preferably, 10,000 or above. According to the invention, these high molecular weight polymers achieve corrosion inhibition and cleaning in detergent compositions without the need for phosphorous containing components.

In one embodiment a detergent composition is provided according to the invention. A detergent composition including an alkalinity source, and at least one high molecular weight polyacrylate (or polyacrylic acid homopolyer) for corrosion inhibition. The cleaning agent also preferably includes a detersive amount of a surfactant. The alkaline source can be provided in an amount effective to provide a use composition having a pH of at least about 8. The high molecular weight polyacrylate (or polyacrylic acid homopolymer) is provided in an amount sufficient to reduce corrosion of aluminum and/or aluminum containing alloys at a pH of about 8 or greater.

Articles which require such cleaning according to the invention includes any article with a surface that contains an alkaline sensitive metal, such as, aluminum or aluminum containing alloys. Such articles can be found in industrial plants, maintenance and repair services, manufacturing facilities, kitchens, and restaurants. Exemplary equipment having a surface containing an alkaline sensitive metals include sinks, cookware, utensils, machine parts, vehicles, tanker trucks, vehicle wheels, work surfaces, tanks, immersion vessels, spray washers, and ultrasonic baths. In addition, a detergent composition is provided according to the invention that can be used in environments other than inside a dishwashing machine. Alkaline sensitive metals in need of cleaning are found in several locations. Exemplary locations also include trucks, vehicle wheels, ware, and facilities. One exemplary application of the alkaline sensitive metal cleaning detergent composition for cleaning alkaline sensitive metals can be found in cleaning vehicle wheels in a vehicle washing facility. Compositions including the novel corrosion inhibitor of the invention may be used in any of these applications and the like.

The invention also includes methods for cleaning aluminum and/or aluminum containing alloys by contacting the surface of the same with the detergent/cleaning compositions of the invention. The detergent/cleaning compositions include a corrosion inhibiting amount of one or more high molecular weight polyacrylates (or polyacrylic acid homopolymers) having a molecular weight of at least about 5000.

The invention also includes methods for protecting aluminum and/or aluminum containing alloys from corrosion by use of the novel corrosion inhibiting composition of the invention. The method involves the step of contacting the surface of aluminum, or an aluminum containing alloy with the corrosion inhibiting composition of the invention. The novel corrosion inhibiting composition includes one or more high molecular weight polyacrylates (or polyacrylic acid homopolymers) having a molecular weight of at least about 5000.

Also included is a method for manufacturing a detergent composition. The method can include a step of adding a corrosion inhibitor comprising one or more high molecular weight polyacrylates (or polyacrylic acid homopolymers) having a molecular weight of at least about 5000 to a detergent composition. The corrosion inhibitor can be added to the detergent composition when the detergent composition is a concentrate and/or when the detergent composition is a use solution.

DETAILED DESCRIPTION OF THE INVENTION

In this specification and the claims that follow, reference will be made to a number of terms that shall be defined to have the following meanings:

The phrase "alkaline sensitive metal" identifies those metals that exhibit corrosion and/or discoloration when exposed to an alkaline detergent in solution. An alkaline solution is an aqueous solution having a pH that is greater than 8. Exemplary alkaline sensitive metals include soft metals such as aluminum, nickel, tin, zinc, copper, brass, bronze, and mixtures thereof. Aluminum and aluminum alloys are common alkaline sensitive metals that can be cleaned by the warewash detergent compositions of the invention.

As used herein, weight percent (wt-%), percent by weight, % by weight, and the like are synonyms that refer to the concentration of a substance as the weight of that substance divided by the total weight of the composition and multiplied by 100.

As used herein, the term "about" modifying the quantity of a component or ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about," the claims include equivalents to the quantities.

The term "surfactant" or "surface active agent" refers to an organic chemical that when added to a liquid changes the properties of that liquid at a surface.

"Cleaning" means to perform or aid in soil removal, bleaching, de-scaling, de-staining, microbial population reduction, rinsing, or combination thereof.

As used herein, the term "substantially free" refers to compositions completely lacking the component or having such a small amount of the component that the component does not affect the performance of the composition. The component may be present as an impurity or as a contaminant and shall be less than 0.5 wt. %. In another embodiment, the amount of the component is less then 0.1 wt. % and in yet another embodiment, the amount of component is less than 0.01 wt. %.

As used herein, the term "ware" includes items such as eating and cooking utensils. As used herein, the term "warewashing" refers to washing, cleaning, or rinsing ware.

As used herein, a solid cleaning composition refers to a cleaning composition in the form of a solid such as a powder, a particle, an agglomerate, a flake, a granule, a pellet, a tablet, a lozenge, a puck, a briquette, a brick, a solid block, a unit dose, or another solid form known to those of skill in the art. The term "solid" refers to the state of the detergent composition under the expected conditions of storage and use of the solid detergent composition. In general, it is expected that the detergent composition will remain in solid form when exposed to elevated temperatures of 100° F. and preferably 120° F. A cast, pressed, or extruded "solid" may take any form including a block. When referring to a cast, pressed, or extruded solid it is meant that the hardened composition will not flow perceptibly and will substantially retain its shape under moderate stress, pressure, or mere gravity. For example, the shape of a mold when removed from the mold, the shape of an article as formed upon extrusion from an extruder, and the like. The degree of hardness of the solid cast composition can range from that of a fused solid block, which is relatively dense and hard similar to concrete, to a consistency characterized as being malleable and sponge-like, similar to caulking material.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the terms "sodium tripolyphosphate-free" or "STPP-free" refers to a composition, mixture, or ingredients that do not contain tripolyphosphates or to which the same has not been added. Should sodium tripolyphosphate or—other phosphate containing compounds be present through contamination of a composition, mixture, or ingredients, the amount of the same shall be less than 0.5 wt. %. In a preferred embodiment, the amount of the same is less than 0.1 wt. % and in a more preferred embodiment, the amount is less than 0.01 wt. %.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both.

Many articles having a surface that requires cleaning contain an alkaline sensitive metal, such as, aluminum or aluminum containing alloys. Such articles can be found in industrial plants, maintenance and repair services, manufacturing facilities, kitchens, and restaurants. Exemplary equipment having a surface containing an alkaline sensitive metals include sinks, cookware, utensils, machine parts, vehicles, tanker trucks, vehicle wheels, work surfaces, tanks, immersion vessels, spray washers, and ultrasonic baths. In addition, a warewash detergent composition is provided according to the invention that can be used in environments other than inside a dishwashing machine. Alkaline sensitive metals in need of cleaning are found in several locations. Exemplary locations also include trucks, vehicle wheels, ware, and facilities. One exemplary application of the alkaline sensitive metal cleaning/warewash detergent composition for cleaning alkaline sensitive metals can be found in cleaning vehicle wheels in a vehicle washing facility. Compositions of the invention may be used in any of these applications.

According to one embodiment of the invention a detergent composition is provided comprising an alkaline source and a novel corrosion inhibitor comprising one or more high molecular weight polyacrylates (or polyacrylic acid homopolymers) having a molecular weight of at least about 5000.

The composition may also preferably include a detersive amount of a surfactant. The alkaline source can be provided in an amount effective to provide a use composition having a pH of at least about 8. The corrosion inhibitor is provided in an amount sufficient to reduce corrosion of aluminum when the detergent composition is provided as a use composition for washing aluminum and aluminum containing alloys.

The detergent composition can be made available as multiple concentrates that are diluted and combined at the situs of use to provide a use solution for application to alkaline sensitive metals. An advantage of providing concentrates that are later combined is that shipping and storage costs can be reduced because it can be less expensive to ship and store a concentrate rather than a use solution and is also more sustainable because less packaging is used. Although the detergent composition according to the invention can be provided as multiple concentrates, it should be understood that the composition can be provided as a ready to use solution. In addition, the multiple concentrates can include two or more concentrates that are added together. In addition, the concentrates can be provided in the form of a liquid solid, paste, gel, granulate, or powder.

The cleaning composition can be characterized as including an alkaline component and a corrosion inhibitor component. The alkaline component includes a source of alkalinity. The source of alkalinity is provided so that the use solution has a pH of at least 8.0. The corrosion inhibitor component includes a corrosion inhibitor of polyacrylic acid and polymaleic acid homopolymers (or salts thereof). The corrosion inhibitor component is provided for reducing corrosion of alkaline sensitive metals by the use solution having a pH of at least 8.0.

A surfactant component may also be present. The surfactant component provides cleaning properties when used as part of the use solution at a pH of at least 8.0. A threshold inhibitor/crystal modifier can also be provided to prevent calcium carbonate precipitation in a use solution provided at a pH in the range of 8.0 to 14.0. Further additional components include the use of chelants as discussed hereinafter.

Source of Alkalinity

The source of alkalinity can be any source of alkalinity that is compatible with the other components of the detergent composition and that will provide a use solution with the desired pH. Exemplary sources of alkalinity include alkali metal hydroxides, alkali metal salts, silicates, phosphates, amines, and mixtures thereof. Exemplary alkali metal hydroxides include sodium hydroxide, potassium hydroxide, and lithium hydroxide. The alkali metal hydroxide may be added to the composition in a variety of forms, including for example in the form of solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as for example, as a 45 wt. %, 50 wt. % and a 73 wt. % solution.

Exemplary alkali metal salts include sodium carbonate, trisodium phosphate, potassium carbonate, and mixtures thereof. Exemplary silicates include sodium metasilicates, sesquisilicates, orthosilicates, potassium silicates, and mixtures thereof. Exemplary phosphates include sodium pyrophosphate, potassium pyrophosphate, and mixtures thereof. Exemplary amines include alkanolamine. Exemplary alkanolamines include triethanolamine, monoethanolamine, diethanolamine, and mixtures thereof.

The source of alkalinity is provided in an amount sufficient to provide the use solution with a pH of at least 8.0. The use solution pH range is preferably between about 8.0 and about 13.0, and more preferably between 10.0 to 12.5. In general, the amount of alkalinity provided in the concentrate can be in an amount of at least about 0.05 wt. % based on the weight of the alkaline concentrate. The source of alkalinity in the concentrate is preferably between about 0.05 wt. % and about 99 wt. %, more preferably is between about 0.1 wt. % and about 95 wt. %, and most preferably is between 0.5 wt. % and 90 wt. %.

Corrosion Inhibitor Component

The invention comprises a novel corrosion inhibitor component of one or more high molecular weight polyacrylates (or polyacrylic acid homopolymers) having a molecular weight of at least about 5000 The corrosion inhibitor component effectively reduces corrosion to alkaline sensitive metals such as aluminum or aluminum containing alloys at a pH of about 8 or greater.

According to one embodiment of the present invention, one or more high molecular weight polyacrylates are used as a corrosion inhibitor. The polyacrylate contains a polymerization unit derived from the monomer selected from the group consisting of acrylic acid, methacrylic acid, methyl acrylate, methyl methacrylate, ethyl acrylate, ethyl methacrylate, butyl acrylate, butyl methacrylate, iso-butyl acrylate, iso-butyl methacrylate, iso-octyl acrylate, iso-octyl methacrylate, cyclohexyl acrylate, cyclohexyl methacrylate, glycidyl acrylate, glycidyl methacrylate, hydroxyethyl acrylate, hydroxypropyl acrylate, 2-hydroxyethyl acrylate, 2-hydroxyethyl methacrylate, 2-hydroxypropyl acrylate, 2-hydroxypropyl methacrylate. and hydroxypropyl methacrylate and a mixture thereof, among which acrylic acid. methacrylic acid, methyl acrylate, methyl methacrylate, butyl acrylate, butyl methacrylate, iso-butyl acrylate, iso-butyl methacrylate, hydroxyethyl acrylate, 2-hydroxyethyl acrylate, 2-hydroxyethyl methacrylate, 2-hydroxypropyl acrylate, and 2-hydroxypropyl methacrylate, and a mixture thereof are preferred.

The above-mentioned acrylate monomers can be selected from the group consisting of methyl acrylate, methyl methacrylate, butyl acrylate, 2-phenoxy ethyl acrylate, ethoxylated 2-phenoxy ethyl acrylate, 2-(2-ethoxyethoxyl)ethyl acrylate, cyclic trimethylolpropane formal acrylate, .beta.-carboxyethyl acrylate, lauryl(meth)acrylate, isooctyl acrylate, stearyl(meth)acrylate, isodecyl acrylate, isoborny (meth)acrylate, benzyl acrylate, hydroxypivalyl hydroxypivalate diacrylate, ethoxylated 1,6-hexanediol diacrylate, dipropylene glycol diacrylate, ethoxylated dipropylene glycol diacrylate, neopentyl glycol diacrylate, propoxylated neopentyl glycol diacrylate, ethoxylated bisphenol-A di(meth)acrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate, diethylene glycol dimethacrylate, 2-hydroxyethyl methacrylate phosphate, tris(2-hydroxy ethyl)isocyanurate triacrylate, pentaerythritol triacrylate, ethoxylated trimethylolpropane triacrylate, propoxylated trimethylolpropane triacrylate, trimethylolpropane trimethacrylate, pentaerythritol tetraacrylate, ethoxylated pentaerythritol tetraacrylate, ditrimethylolpropane tetraacrylate, propoxylated pentaerythritol tetraacrylate, pentaerythritol tetraacrylate, dipentaerythritol hexaacrylate, (meth)acrylate, hydroxyethyl acrylate (HEA), 2-hydroxyethyl methacrylate (HEMA), tripropylene glycol di(meth)acrylatel, 4-butanediol di(meth) acrylate, 1,6-hexanediol di(meth)acrylate, allylated cyclohexyl di(meth)acrylate, isocyanurate di(meth)acrylate, ethoxylated trimethylol propane tri(meth)acrylate, propoxylated glycerol tri(meth)acrylate, trimethylol propane tri (meth)acrylate, and tris(acryloxyethyl)isocyanurate, and a mixture thereof.

Polyacrylic acids, $(C_3H_4O_2)_n$ or 2-Propenoic acid homopolymer; Acrylic acid polymer; Poly(acrylic acid); Propenoic acid polymer; PAA have the following structural formula:

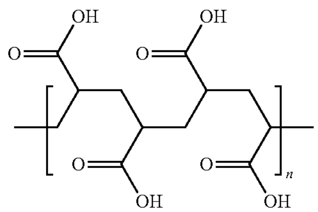

where n is any integer.

Examples of polyacrylates (polyacrylic homopolymers) which may be used for the invention and that are those with a molecular weight of at least about 5000. One source of commercially available polyacrylates (polyacrylic homopolymers) useful for the invention includes the Acusol 445 series from The Dow Chemical Company, Wilmington Del., USA. The polyacrylates (polyacrylic homopolymers) commercially available are Acusol 929 (10,000 MW) and Acumer 1510 (60,000 MW) both also available from Dow Chemical. Yet another commercially available polyacrylic acid is AQUATREAT AR-6 (100,000 MW) from AkzoNobel Strawinskylaan 2555 1077 ZZ Amsterdam Postbus 75730 1070 AS Amsterdam. Other suitable polyacrylates (polyacrylic homopolymers) for use in the invention include, can be obtained from suppliers such as Aldrich Chemicals, Milwaulkee, Wis., and ACROS Organics and Fine Chemicals, Pittsburgh, Pa.

The corrosion inhibitor component can be provided in the corrosion inhibitor concentrate in an amount sufficient to provide a desired level of corrosion inhibition when used in the use solution. There should be sufficient amount of corrosion inhibitor to provide the desired corrosion inhibiting affect. It is expected that the upper limit on the corrosion inhibitor component will be controlled by solubility. The corrosion inhibitor component can be provided in the corrosion inhibitor concentrate in an amount of at least about 0.005 wt. %. It is preferred that the corrosion inhibitor component be provided in the concentrate in an amount of between about 0.5 wt. % and about 50 wt. %, more preferably between about 1 wt. % and about 30 wt. %, and most preferably between 5% and 15% active polymer.

As further provided herein, additional corrosion inhibitors may also be added to the detergent/cleaning compositions of the invention.

Cleaning Agent/Surfactant

The detergent composition can include at least one cleaning agent comprising a surfactant or surfactant system. A variety of surfactants can be used in a warewashing composition, such as anionic, nonionic, cationic, and zwitterionic surfactants. It should be understood that surfactants are an optional component of the detergent composition and can be excluded. The detergent composition, when provided as a concentrate, can include the cleaning agent in a range of between about 0.5 wt. % and about 20 wt. %, more preferably in a range between about 1 wt. % and 10 wt. %, and most preferably in a range between about 1.5 wt. % and 5 wt. %. Additional exemplary ranges of surfactant in a concentrate include about 0.05 wt. % to 7.5 wt. %, more preferably about 0.5 wt. % to 5 wt. %, and most preferably about 1 wt. % to 3 wt. %.

Exemplary surfactants that can be used are commercially available from a number of sources. For a discussion of surfactants, see Kirk-Othmer, Encyclopedia of Chemical Technology, Third Edition, volume 8, pages 900-912. When the composition includes a cleaning agent, the cleaning agent can be provided in an amount effective to provide a desired level of cleaning.

Anionic surfactants useful detergent compositions include, for example, carboxylates such as alkylcarboxylates (carboxylic acid salts) and polyalkoxycarboxylates, alcohol ethoxylate carboxylates, nonylphenol ethoxylate carboxylates, and the like; sulfonates such as alkylsulfonates, alkylbenzenesulfonates, alkylarylsulfonates, sulfonated fatty acid esters, and the like; sulfates such as sulfated alcohols, sulfated alcohol ethoxylates, sulfated alkylphenols, alkylsulfates, sulfosuccinates, alkylether sulfates, and the like; and phosphate esters such as alkylphosphate esters, and the like. Exemplary anionic surfactants include sodium alkylarylsulfonate, alpha-olefinsulfonate, and fatty alcohol sulfates.

Nonionic surfactants useful in the detergent composition include, for example, those having a polyalkylene oxide polymer as a portion of the surfactant molecule. Such nonionic surfactants include, for example, chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated ethylene diamine; alcohol alkoxylates such as alcohol ethoxylate propoxylates, alcohol propoxylates, alcohol propoxylate ethoxylate propoxylates, alcohol ethoxylate butoxylates, and the like; nonylphenol ethoxylate, polyoxyethylene glycol ethers and the like; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and polyalkylene oxide block copolymers including an ethylene oxide/propylene oxide block copolymer such as those commercially available under the trademark PLURONIC® (BASF-Wyandotte), and the like; and other like nonionic compounds. Silicone surfactants such as the ABIL® B8852 can also be used.

Cationic surfactants that can be used in the detergent composition include amines such as primary, secondary and tertiary monoamines with $C_{1-8}$ alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquatemary ammonium chloride surfactants such as n-alkyl($C_{12}$-$C_{18}$) dimethylbenzyl ammonium chloride, n-tetradecyldimethylbenzylammonium chloride monohydrate, a naphthylene-substituted quaternary ammonium chloride such as dimethyl-1-naphthylmethylammonium chloride, and the like. The cationic surfactant can be used to provide sanitizing properties.

Zwitterionic surfactants that can be used in the detergent composition include betaines, imidazolines, and propinates. If the detergent composition is intended to be used in an automatic dishwashing or warewashing machine, the surfactants selected, if any surfactant is used, can be those that provide an acceptable level of foaming. It should be understood that warewashing compositions for use in automatic dishwashing or warewashing machines are generally considered to be low-foaming compositions.

The surfactant can be selected to provide low foaming properties. One would understand that low foaming surfactants that provide the desired level of detersive activity are advantageous in an environment such as a dishwashing machine where the presence of large amounts of foaming can be problematic. In addition to selecting low foaming surfactants, one would understand that defoaming agents can be utilized to reduce the generation of foam. Accordingly, surfactants that are considered low foaming surfactants as well as other surfactants can be used in the detergent composition and the level of foaming can be controlled by the addition of a defoaming agent.

Threshold Agent/Crystal Modifier Component

The detergent composition may also include a threshold agent or crystal modifier. for reducing precipitation of calcium carbonate in the use solution. In general, it is expected that the threshold agent/crystal modifier component will loosely hold calcium to reduce precipitation of calcium carbonate once it is subjected to a pH of at least 8.0.

Exemplary threshold agents/crystal modifiers include phosphonocarboxylic acids, phosphonates, phosphates, chelants, polymers, and mixtures thereof. Exemplary phosphonocarboxylic acids include those available under the name Bayhibit™ AM from Bayer, and include 2-phosphonobutane-1,2,4, tricarboxylic acid (PBTC). Exemplary phosphonates include amino tri(methylene phosphonic acid), 1-hydroxy ethylidene 1-1-diphosphonic acid, ethylene diamine tetra(methylene phosphonic acid), hexamethylene diamine tetra(methylene phosphonic acid), diethylene triamine penta(methylene phosphonic acid), and mixtures thereof. Exemplary phosphonates are available under the name Dequest™ from Monsanto. Exemplary polymers include polyacrylates, polymethacrylates, polyacrylic acid, polyitaconic acid, polymaleic acid, sulfonated polymers, copolymers and mixtures thereof. It should be understood that the mixtures can include mixtures of different acid substituted polymers within the same general class. In addition, it should be understood that salts of acid substituted polymers can be used. The useful carboxylated polymers may be generically categorized as water-soluble carboxylic acid polymers such as polyacrylic and polymethacrylic acids or vinyl addition polymers. Of the vinyl addition polymers contemplated, maleic anhydride copolymers as with vinyl acetate, styrene, ethylene, isobutylene, acrylic acid and vinyl ethers are examples. The polymers tend to be water-soluble or at least colloidally dispersible in water. The molecular weight of these polymers may vary over a broad range although it is preferred to use polymers having average molecular weights ranging between 1,000 up to 1,000,000, more preferably a molecular weight of 100,000 or less, and most preferably a molecular weight between 1,000 and 10,000.

The polymers or copolymers (either the acid-substituted polymers or other added polymers) may be prepared by either addition or hydrolytic techniques. Thus, maleic anhydride copolymers are prepared by the addition polymerization of maleic anhydride and another comonomer such as styrene. The low molecular weight acrylic acid polymers may be prepared by addition polymerization of acrylic acid or its salts either with itself or other vinyl comonomers. Alternatively, such polymers may be prepared by the alkaline hydrolysis of low molecular weight acrylonitrile homopolymers or copolymers. For such a preparative technique see Newman U.S. Pat. No. 3,419,502.

The threshold agent/crystal modifier component should be provided in an amount sufficient so that when it is in the use solution, it sufficiently disrupts crystal growth or prevents the precipitation of calcium carbonate and other insoluble salts such as magnesium silicate, magnesium hydroxide, and the like. In a preferred embodiment, the threshold agent/crystal modifier component can be provided in a range of about 0.0001 wt. % to about 25 wt. %, and more preferably in a range between about 0.001 wt. % and about 10 wt. %, and most preferably between about 0.01% and 8% based on the weight of the concentrate. It should be understood that the polymers, phosphonocarboxylates, and phosphonates can be used alone or in combination.

Hydrotrope Component

A hydrotrope component can be used to help stabilize the surfactant component. It should be understood that the hydrotrope component is optional and can be omitted if it is not needed for stabilizing the surfactant component. In many cases, it is expected that the hydrotrope component will be present to help stabilize the surfactant component. Examples of the hydrotropes include the sodium, potassium, ammonium and alkanol ammonium salts of xylene, toluene, ethylbenzoate, isopropylbenzene, naphthalene, alkyl naphthalene sulfonates, phosphate esters of alkoxylated alkyl phenols, phosphate esters of alkoxylated alcohols, short chain ($C_8$ or less) alkyl polyglycoside, sodium, potassium and ammonium salts of the alkyl sarcosinates, salts of cumene sulfonates, amino propionates, diphenyl oxides, and disulfonates. The hydrotropes are useful in maintaining the organic materials, including the surfactant, readily dispersed in the cleaning composition and/or aqueous cleaning solution.

Additional Corrosion Inhibitors

Additional corrosion inhibitors which may be optionally added to the detergent compositions of this invention include magnesium and/or zinc. Preferably, the metal ions are provided in water soluble form. Examples of useful water soluble forms of magnesium and zinc ions are the water soluble salts thereof including the chlorides, nitrates and sulfates of the respective metals. If any of the alkalinity providing agents are the alkali metal carbonates, bicarbonates or mixtures of such agents, magnesium oxide can be used to provide the Mg ion. The magnesium oxide is water soluble in such solutions and is a preferred source of Mg ions. In order to maintain the dispersibility of the magnesium and/or zinc corrosion inhibitors in aqueous solution, and in the presence of agents which would otherwise cause precipitation of the zinc or magnesium ions, e.g., carbonates, phosphates, etc., it might be advantageous to include a carboxylated polymer to the solution.

Other Additives

The detergent composition can include other additives such as chelating/sequestering agents, bleaching agents, detergent builders or fillers, hardening agents or solubility modifiers, defoamers, anti-redeposition agents, threshold agents, stabilizers, dispersants, enzymes, aesthetic enhancing agents (i.e., dye, perfume), and the like. Adjuvants and other additive ingredients will vary according to the type of composition being manufactured. It should be understood that these additives are optional and need not be included in the cleaning composition. When they are included, they can be included in an amount that provides for the effectiveness of the particular type of component.

Water conditioning polymers can also be used as a form of builder. Exemplary water conditioning polymers include polycarboxylates. Exemplary polycarboxylates that can be used as builders and/or water conditioning polymers include those having pendant carboxylate ($—CO_2.^-$) groups and include, for example, polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, and the like. For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein.

Bleaching agents for use in a cleaning compositions for lightening or whitening a substrate, include bleaching compounds capable of liberating an active halogen species, such as $Cl_2$, $Br_2$, —OCL and/or —$OBr^-$, under conditions typically encountered during the cleansing process. Suitable bleaching agents for use in the present cleaning compositions include, for example, chlorine-containing compounds such as chlorine, hypochlorite, and/or chloramine. Exemplary halogen-releasing compounds include the alkali metal dichloroisocyanurates, chlorinated trisodium phosphate, the alkali metal hypochlorites, monochloramine and dichloramine, and the like. Encapsulated chlorine sources may also be used to enhance the stability of the chlorine source in the composition (see, for example, U.S. Pat. Nos. 4,618,914 and 4,830,773, the disclosure of which is incorporated by reference herein). A bleaching agent may also be a peroxygen or active oxygen source such as hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine, and the like. The composition can include an effective amount of a bleaching agent. In a preferred embodiment when the concentrate includes a bleaching agent, it can be included in an amount of about 0.1 wt. % to about 60 wt. %, more preferably between about 1 wt. % and about 20 wt. %, and most preferably between about 3 wt. % and about 8 wt. %.

The composition can include an effective amount of detergent fillers, which does not perform as a cleaning agent per se, but cooperates with the cleaning agent to enhance the overall cleaning capacity of the composition. Examples of detergent fillers suitable for use in the present cleaning compositions include sodium sulfate, sodium chloride, starch, sugars, $C_1$-$C_{10}$ alkylene glycols such as propylene glycol, and the like. When the concentrate includes a detergent filler, it can be included an amount of about 1 wt. % to about 20 wt. % and between about 3 wt. % to about 15 wt. %.

A defoaming agent for reducing the stability of foam may also be included in the composition to reduce foaming. When the concentrate includes a defoaming agent, the defoaming agent can be provided in an amount of between about 0.01 wt. % and about 3 wt. %.

Examples of defoaming agents that can be used in the composition includes ethylene oxide/propylene block copolymers silicone compounds such as silica dispersed in polydimethylsiloxane, polydimethylsiloxane, and functionalized polydimethylsiloxane such as those available under the name Abil B9952, fatty amides, hydrocarbon waxes, fatty acids, fatty esters, fatty alcohols, fatty acid soaps, ethoxylates, mineral oils, polyethylene glycol esters, alkyl phosphate esters such as monostearyl phosphate, and the like. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein.

The composition can include an anti-redeposition agent for facilitating sustained suspension of soils in a cleaning solution and preventing the removed soils from being redeposited onto the substrate being cleaned. Examples of suitable anti-redeposition agents include fatty acid amides, fluorocarbon surfactants, complex phosphate esters, styrene maleic anhydride copolymers, and cellulosic derivatives such as hydroxyethyl cellulose, hydroxypropyl cellulose, and the like. In a preferred embodiment, the anti-redeposition agent, when included in the concentrate, is added in an amount between about 0.5 wt. % and about 10 wt. %, and more preferably between about 1 wt. % and about 5 wt. %.

Stabilizing agents that can be used include primary aliphatic amines, betaines, borate, calcium ions, sodium citrate, citric acid, sodium formate, glycerine, maleonic acid, organic diacids, polyols, propylene glycol, and mixtures thereof. The concentrate need not include a stabilizing agent, but when the concentrate includes a stabilizing agent, it can be included in an amount that provides the desired level of stability of the concentrate. In a preferred embodiment the amount of stabilizing agent is about 0 to about 20 wt. %, more preferably about 0.5 wt. % to about 15 wt. %, and most preferably about 2 wt. % to about 10 wt. %.

Dispersants that can be used in the composition include maleic acid/olefin copolymers, polyacrylic acid, and mixtures thereof. The concentrate need not include a dispersant, but when a dispersant is included it can be included in an amount that provides the desired dispersant properties. Exemplary ranges of the dispersant in the concentrate can be between about 0 and about 20 wt. %, more preferably between about 0.5 wt. % and about 15 wt. %, and most preferably between about 2 wt. % and about 9 wt. %.

Enzymes can be included in the composition to aid in soil removal of robust soils such as starch, protein, and the like. Exemplary types of enzymes include proteases, alpha-amylases, and mixtures thereof. Exemplary proteases that can be used include those derived from *Bacillus licheniformix, Bacillus lenus, Bacillus alcalophilus*, and *Bacillus amyloliquefacins*. Exemplary alpha-amylases include *Bacillus subtilis, Bacillus amyloliquefaceins* and *Bacillus licheniformis*. The concentrate need not include an enzyme. When the concentrate includes an enzyme, it can be included in an amount that provides the desired enzymatic activity when the warewashing composition is provided as a use composition. Exemplary ranges of the enzyme in the concentrate include between about 0 and about 15 wt. %, more preferably between about 0.5 wt. % and about 10 wt. %, and most preferably between about 1 wt. % and about 5 wt. %.

In addition to providing alkalinity and having anti-redeposition properties silicates can also provide further metal protection. Exemplary silicates include sodium silicate and potassium silicate. The detergent composition can be provided without silicates, but when silicates are included, they can be included in amounts that provide for desired metal protection. The concentrate can include silicates in a range between about 10 wt. % and about 80 wt. %, more preferably between about 30 wt. % and about 70 wt. %, and most preferably between about 40 wt. % and 60 wt. %.

The concentrate can include water. In general, it is expected that water may be present as a processing aid and may be removed or become water of hydration. It is expected that water may be present in both the liquid concentrate and in the solid concentrate. In the case of the liquid concentrate, it is expected that water will be present in a range of between about 5 wt. % and about 95 wt. %, more preferably between about 20 wt. % and about 75 wt. %, and most preferably between about 30 wt. % and about 50 wt. %. In the case of a solid concentrate, it is expected that the water will be present in ranges between about 5 wt.

% and about 60 wt. %, more preferably between about 15 wt. % and about 45 wt. %, and most preferably between about 25 wt. % and about 40 wt. %. It should be additionally appreciated that the water may be provided as deionized water or as softened water.

Various dyes, odorants including perfumes, and other aesthetic enhancing agents can be included in the composition. Dyes may be included to alter the appearance of the composition, as for example, Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keystone Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), and the like.

Fragrances or perfumes that may be included in the compositions include, for example, terpenoids such as citronellol, aldehydes such as amyl cinnamaldehyde, a jasmine such as CIS-jasmine or jasmal, vanillin, and the like.

When the components that are processed to form the detergent are processed into a block, it is expected that the components can be processed by extrusion, casting, or pressed solid techniques. In general, when the components are processed by extrusion techniques, it is believed that the composition can include a relatively smaller amount of water as an aid for processing compared with the casting techniques. In general, when preparing the solid by extrusion, it is expected that the composition can contain between about 2 wt. % and about 10 wt. % water. When preparing the solid by casting, it is expected that the amount of water can be provided in an amount between about 20 wt. % and about 50 wt. %.

The detergents of the invention may exist in a use solution or concentrated solution that is in any form including liquid, free flowing granular form, powder, gel, paste, solids, slurry, and foam. The cleaning solutions are suitable to treat any metal surface contaminated with a wide variety of contaminants. Exemplary contaminants include grease, clay, dirt, and oxide by-products. The present solutions may be used by contacting the contaminated metal parts with an effective amount of the aqueous solution. Preferred contact methods include immersion or some type of impingement in which the cleaning solution is circulated or continuously agitated against the metal part or is sprayed thereon. Alternatively, agitation can be provided as ultrasonic waves. The present invention is also suitable for clean-in-place operations that do not require disassembly of equipment.

The warewash detergents of this invention may be used at any temperature, including an elevated temperature of about 90-180° F.

The various forms of the warewashing composition concentrate can be provided in a water soluble packaging film. That is, solids and liquids can be packaged in the water soluble films. Exemplary solids that can be packaged in a water soluble film include powders, pellets, tablets, and blocks. Exemplary liquids that can be packaged in the water soluble film include gels and pastes.

The warewashing composition can be provided in the form of a solid. Exemplary solid dishwashing compositions are disclosed in U.S. Pat. No. 6,410,495 to Lentsch et al., U.S. Pat. No. 6,369,021 to Man et al., U.S. Pat. No. 6,258,765 to Wei et al, U.S. Pat. No. 6,177,392 to Lentsch et al., U.S. Pat. No. 6,164,296 to Lentsch et al., U.S. Pat. No. 6,156,715 to Lentsch et al., and U.S. Pat. No. 6,150,624 to Lentsch et al. The compositions of each of these patents are incorporated herein by reference.

Hard water is often characterized as water containing a total dissolved solids (TDS) content in excess of 200 ppm. This type of water is often referred to as high solids containing water. In certain localities, the water contains a total dissolved solids content in excess of 400 ppm, and even in excess of 800 ppm. The dissolved solids refers to the presence of calcium and magnesium. These components of hard water can be addressed by softening and/or treating the water, using builders, threshold agents, crystal modifiers and/or sequestrants in the detergent composition. In the case of water softening, sodium is often used to displace the calcium and magnesium. The warewashing composition can include builder and/or sequestrant to handle the calcium and thereby reduce its tendency to precipitate with the calcium carbonate.

The detergent composition can include an effective amount of anti-etching agent to prevent corrosion to glassware. The calcium that is available in a use composition for precipitating with the aluminum ion can be referred to as "free calcium ion" and is generally considered to be the unchelated calcium ion in the use composition. When the level of free calcium ion is relatively small, it is believed that the weight ratio of the zinc ion to the aluminum ion can be provided at levels that provides the desired corrosion resistances exhibited by a lack of etching. Because the presence of free calcium ion is not a particular concern, it is believed that filming caused by precipitation of calcium ion and aluminum ion will not be very significant. As a result, the ratio of the zinc ion to the aluminum ion can be selected as described in U.S. application Ser. No. 10/612,474 that was filed with the United States Patent and Trademark Office on Jul. 2, 2003, and which is incorporated herein by reference in its entirety. By way of example, the weight ratio of the zinc ion to the aluminum ion can be provided in a range of between about 20:1 to about 1:6, more preferably with a weight ratio of the zinc ion to the aluminum ion in a range of between about 15:1 and about 1:2. In situations where the free calcium ion is available in the use composition at a level sufficient to cause precipitation of the calcium ion and the aluminum ion to provide visible filming, the ratio of the zinc ion to the aluminum ion can be controlled to provide resistance to etching and also resistance to visible filming from precipitation of the calcium ion and the aluminum ion. For example, when the use composition contains in excess of 200 ppm free calcium ion, the weight ratio of the zinc ion to the aluminum ion can be provided at greater than 2:1. By way of an exemplary range, it is believed that the weight ratio of the zinc ion to the aluminum ion can be provided in a range between about 20:1 and about 2:1, more preferably the weight ratio of zinc ion to aluminum ion can be greater than about 3:1, and most preferably can be provided in a range between about 15:1 and about 3:1. In addition, the weight ratio of zinc ion to aluminum ion can be provided at greater than about 4:1 and can be provided at greater than about 6:1. It should be understood that the ratio of zinc ion to aluminum ion may exceed 15:1 and 20:1 when corrosion resistance can still be provided. Furthermore, it should be understood that the reference to the weight ratio of the zinc ion and the aluminum ion refers to a weight ratio based upon the zinc component of the zinc ion and the aluminum component of the aluminum ion. That is, it is the weight of the metal that is determined for purposes of the weight ratio rather than the weight of the entire molecule that may contain the metal. For example, in the case of sodium aluminate, the weight of the aluminum ion refers to the aluminum component of the molecule rather than the entire aluminate ion.

Formulating the Detergent Composition

The detergent composition can be formulated to handle the expected corrosion in a given environment. That is, the concentration of the corrosion inhibitor can be adjusted depending upon several factors at the situs of use including, for example, water hardness, food soil concentration, alkalinity and the like. In machine warewashing applications, a soil concentration of about 25 grams per gallon or more is considered high, a concentration of about 15 to about 24 grams per gallon is considered medium, and a concentration of about 14 grams per gallon or less is considered low. Also, water hardness exhibiting 15 grains per gallon or more is considered high, about 6 to about 14 grains per gallon is considered medium, and about 5 grains per gallon or less is considered low. In a use composition, an alkalinity of about 300 ppm or higher is considered high, an alkalinity of about 200 ppm to about 300 ppm is considered medium, and an alkalinity of about 200 ppm or less is considered low. In a use composition, a builder concentration of about 300 ppm or more is considered high, a builder concentration of about 150 ppm to about 300 ppm is considered medium, and a builder concentration of 150 ppm or less is considered low.

Based on the desired minimum concentration of the corrosion inhibitor in the use composition, the amount of the corrosion inhibitor in the concentrate can be calculated knowing the solids content of the use composition and the concentrate can be formulated to provide at least the desired level of corrosion protection.

Forming the Concentrate

The components can be mixed/blended, extruded, or cast to form a solid such as pellets, powders or blocks. Heat can be applied from an external source to facilitate processing of the mixture.

A mixing system provides for continuous mixing of the ingredients at high shear to form a substantially homogeneous liquid or semi-solid mixture in which the ingredients are distributed throughout its mass. The mixing system includes means for mixing the ingredients to provide shear effective for maintaining the mixture at a flowable consistency, with a viscosity during processing of about 1,000-1,000,000 cP, preferably about 50,000-200,000 cP. The mixing system can be a continuous flow mixer or a single or twin screw extruder apparatus.

The mixture can be processed at a temperature to maintain the physical and chemical stability of the ingredients, such as at ambient temperatures of about 20-80° C., and about 25-55° C. Although limited external heat may be applied to the mixture, the temperature achieved by the mixture may become elevated during processing due to friction, variances in ambient conditions, and/or by an exothermic reaction between ingredients. Optionally, the temperature of the mixture may be increased, for example, at the inlets or outlets of the mixing system.

An ingredient may be in the form of a liquid or a solid such as a dry particulate, and may be added to the mixture separately or as part of a premix with another ingredient, as for example, the corrosion inhibitor component may be separate from the remainder of the detergent. One or more premixes may be added to the mixture.

The ingredients are mixed to form a substantially homogeneous consistency wherein the ingredients are distributed substantially evenly throughout the mass. The mixture can be discharged from the mixing system through a die or other shaping means. The profiled extrudate can be divided into useful sizes with a controlled mass. The extruded solid can be packaged in film. The temperature of the mixture when discharged from the mixing system can be sufficiently low to enable the mixture to be cast or extruded directly into a packaging system without first cooling the mixture. The time between extrusion discharge and packaging can be adjusted to allow the hardening of the detergent block for better handling during further processing and packaging. The mixture at the point of discharge can be about 20-90° C., and about 25-55° C. The composition can be allowed to harden to a solid form that may range from a low density, sponge-like, malleable, caulky consistency to a high density, fused solid, concrete-like block.

Optionally, heating and cooling devices may be mounted adjacent to mixing apparatus to apply or remove heat in order to obtain a desired temperature profile in the mixer. For example, an external source of heat may be applied to one or more barrel sections of the mixer, such as the ingredient inlet section, the final outlet section, and the like, to increase fluidity of the mixture during processing. Preferably, the temperature of the mixture during processing, including at the discharge port, is maintained at about 20-900° C.

When processing of the ingredients is completed, the mixture may be discharged from the mixer through a discharge die. The solidification process may last anywhere from a few minutes to about six hours, depending, for example, on the size of the cast or extruded composition, the ingredients of the composition, the temperature of the composition, and other like factors. Preferably, the cast or extruded composition "sets up" or begins to harden to a solid form within about 1 minute to about 6 hours, more preferably within about 1 minute to about 3 hours, and most preferably within about 1 minute to about 1.0 hours.

The concentrate can be provided in the form of a liquid. Various liquid forms include gels and pastes. Of course, when the concentrate is provided in the form of a liquid, it is not necessary to harden the composition to form a solid. In fact, it is expected that the amount of water in the composition will be sufficient to preclude solidification. In addition, dispersants and other components can be incorporated into the concentrate in order to maintain a desired distribution of components.

The packaging receptacle or container may be rigid or flexible, and composed of any material suitable for containing the compositions produced according to the invention, as for example glass, metal, plastic film or sheet, cardboard, cardboard composites, paper, and the like. The composition is processed at around 150-170° F. and are generally cooled to 100-150° before packaging allowing the mixture to be directly added to the container or other packaging system without structurally damaging the receptacle. As a result, a wider variety of materials may be used as packaging systems.

The packaging material can be provided as a water soluble packaging material such as a water soluble packaging film. Exemplary water soluble packaging films are disclosed in U.S. Pat. Nos. 6,503,879; 6,228,825; 6,303,553; 6,475,977; and 6,632,785, the disclosures of which are incorporated herein by reference. An exemplary water soluble polymer that can provide a packaging material that can be used to package the concentrate includes polyvinyl alcohol. The packaged concentrate can be provided as unit dose packages or multiple dose packages. In the case of unit dose packages, it is expected that a single packaged unit will be placed in the cleaning apparatus, such as the detergent compartment of the dishwashing machine, and will be used up during a single wash cycle. In the case of a multiple dose package, it is expected that the unit will be placed in a hopper and a stream of water will erode a surface of the concentrate to provide a liquid concentrate that will be introduced into the dishwashing machine.

While the invention is described in the context of a warewashing composition for washing articles in an automatic dishwashing machine, it should be understood that the composition can be used for washing non-ware items. That is, the composition can be referred to as a cleaning composition and can be used to clean various items and, in particular, items that may suffer from corrosion and/or etching. It should be understood that because the detergent is intended to be used in an automatic dishwashing machine certain components can be excluded from the detergent compositions not intended for use in warewash machines, and vice versa. For example, surfactants that generate a lot of foam may be used in a cleaning composition not intended for use in an automatic dishwashing machine.

Exemplary ranges of the detergent composition in its simplest form include a source of alkalinity and a corrosion inhibitor. It is preferred that thesource of alkalinity comprises a range of 30-99 wt. %, more preferably a range of 35-80 wt. % and most preferably a range of 40-70%. The corrosion inhibitor of the invention is present in a preferred range of 1-30 wt. %, a more preferred range of 5-25 wt. % and a most preferred range of 10 to 20 wt. % of active polymer.

According to the invention, the corrosion inhibitor comprises one or more high molecular weight polyacrylates (polyacrylic homopolymers) having a molecular weight of at least about 5000.

Exemplary ranges for typical components of detergent compositions including the corrosion inhibitor of the invention are shown in tables 1 and 2. Exemplary ranges when provided as a gel or a paste are shown in Table 1. Exemplary ranges for components of the detergent composition when provided as a solid are shown in Table 2.

TABLE 1

| Gel or Paste Detergent Composition (wt. %) | | | |
|---|---|---|---|
| Component | First Exemplary | Second Exemplary | Third Exemplary |
| Water | 5-95 | 20-75 | 30-50 |
| Silicate/ alkaline source | 0-65 | 25-60 | 35-55 |
| Builder | 0-30 | 3-20 | 6-15 |
| Stabilizer | 0-20 | 0.5-15 | 2-10 |
| Dispersant | 0-20 | 0.5-15 | 2-9 |
| Enzyme | 0-15 | 0.5-10 | 1-5 |
| Polyacrylate Corrosion Inhibitor | 0.5-50 | 1-30 | 5-20 |
| Surfactant | 0.5-15 | 1-10 | 2-5 |
| Fragrance | 0-10 | 0.01-5 | 0.1-2 |
| Dye | 0-1 | 0.001-0.5 | 0.01-0.25 |

TABLE 2

| Solid Detergent Composition (wt. %) | | | |
|---|---|---|---|
| Component | First Exemplary | Second Exemplary | Third Exemplary |
| Water | 5-60 | 15-45 | 25-40 |
| Builder | 0-60 | 25-50 | 35-45 |
| Silicate/ alkaline source | 0-65 | 25-60 | 35-55 |
| Dispersant | 0-10 | 0.001-5 | 0.01-1 |
| Enzyme | 0-15 | 1-10 | 2-5 |
| Polyacrylate- Corrosion Inhibitor | 0.5-50 | 1-30 | 5-20 |
| Surfactant | 0.5-15 | 1-10 | 2-5 |
| Fragrance | 0-10 | 0.01-5 | 0.1-2 |
| Dye | 0-1 | 0.001-0.5 | 0.01-0.25 |

The above specification provides a basis for understanding the broad meets and bounds of the invention. The following examples and test data provide an understanding of certain specific embodiments of the invention. The examples are not meant to limit the scope of the invention that has been set forth in the foregoing description. Variations within the concepts of the invention are apparent to those skilled in the art.

EXAMPLES

Example 1

According to the invention, several detergent compositions were prepared with high molecular weight polyacrylates (polyacrylic acid homopolymer) having a molecular weight of at least about 5000 as the corrosion inhibitor and compared to a commercially available control formulation containing sodium tripolyphosphate as a corrosion inhibitor. The detergent components were kept constant except for the corrosion inhibitor component. Commercially available high molecular weight polyacrylates (polyacrylic acid homopolymer) having a molecular weight of at least about 5000 used in the 3 samples are listed below.

Acusol 929—10,000 MW polyacrylate, 45% active

Acumer 1510—70,000 MW polyacrylate, 25% active

Acusol 445ND—4,500 MW polyacrylate, 95-100% active

The components of the test detergents are listed in Tables A and B below.

TABLE A

| Corrosion Inhibitor Component | | | | |
|---|---|---|---|---|
| Corrosion Inhibitor | CONTROL | EXP1 | EXP2 | EXP3 |
| STPP | 25 wt. % | 0 | 0 | 0 |
| PolyAcrylate | | Acusol 929 (45%) 22 wt. % | Acumer 1510 (25%) 40 wt. % | Acusol 445ND 10 wt. % |

TABLE B

| Warewash detergent components | | | | |
|---|---|---|---|---|
| | CONTROL | EXP1 | EXP2 | EXP3 |
| Softened water | 30.877 wt. % | 24 wt. % | 6 wt. % | 36 wt. % |
| Source of alkalinity | 25.85 wt. % | 53 wt. % | 53 wt. % | 53 wt. % |
| Surfactant | .86 wt. % | 1 wt. % | 1 wt. % | 1 wt. % |

The experimental detergent compositions and the control were tested according to standard protocol in a multi-cycle aluminum corrosion inhibition evaluation for warewash detergents as described hereinafter.

A 13"×9" aluminum sheet pan was obtained by cutting a 13"×18" pan in half. The pan was gently cleaned with warm soapy water and a non-abrasive sponge to ensure any foreign materials or residues from cutting and storage were removed. Next a dishwasher was filled with water and heaters were turned on. For high temperature machines, the wash temperature was set to 160° F. and the final rinse temperature was adjusted to 180° F. The Machine was then primed with the desired concentration of detergent and the pan was placed in the second slot from front with the rim facing down and cut edge facing up.

The pan rack was then pushed into the machine, the door was closed, and the cycle was started. At the beginning of each cycle, the appropriate amount of detergent was added to the wash tank to make up for the rinse dilution. This was repeated until the desired number of cycles were completed.

Results:

Pans were rated visually and photographed against a black background. The rating scale used was as follows and was the same for the front and back of each pan:

| Rating | Film |
|---|---|
| 1 | No corrosion or discoloration |
| 2 | Approximately 25% of the pan is discolored and/or corroded |
| 3 | Approximately 50% of the pan is discolored and/or corroded |
| 4 | Approximately 75% of the pan is discolored and/or corroded |
| 5 | All or nearly all of the pan is heavily discolored and/or corroded |

The results shown in the following table correlate to the compositions shown above. Results are graded visually from 1 (best) to 5 (worst) depending upon the amount of blackening/corrosion of an aluminum pan.

| Product | Cycles | Conc (ppm) | Front Score | Back Score |
|---|---|---|---|---|
| SMP In-Line | 50 | 2000 | 1 | 1 |
| SMP 1 | 50 | 975 | 1 | 1.5 |
| SMP 2 | 50 | 975 | 1.5 | 1 |
| SMP 3 | 50 | 975 | 5 | 5 |

As can be seen, the high molecular weight polyacrylates (acrylic acid homopolymer) cleaned almost as well as the control, and are much more environmentally friendly as the formulations contained to phosphorous.

As also can be seen the at molecular weights of under 5000, the corrosion inhibition was unsatisfactory, thus the polyacrylate (polyacrylic acid homopolymer) should have a molecular weight of at least about 5000 and preferably 10,000 or more.

What is claimed is:

1. A detergent composition comprising:

(a) an alkaline source in an amount effective to provide a use composition having a pH of at least about 8 and obtained by diluting the detergent composition with water;

(b) a corrosion inhibitor component in an amount sufficient for reducing corrosion of aluminum or aluminum containing alloys, the corrosion inhibitor component comprising one or more polyacrylic acid homopolymers having a molecular weight of at least about 5,000 daltons, wherein said sufficient amount of corrosion inhibitor is greater than 10 wt. % and 30 wt. %; and (c) less than about 0.1% by weight of phosphorous, wherein said composition does not contain polymaleic acid polymers, wherein said composition does not include sodium carbonate, wherein said composition does not include an active oxygen source bleaching agent, and wherein said composition does not include 1-hydroxy ethylidene 1-1-diphosphonic acid.

2. The detergent composition according to claim 1 further comprising:

(d) a cleaning agent comprising a detersive amount of a surfactant.

3. The detergent composition according to claim 2, wherein the detergent composition comprises between about 0.5 wt. % and about 20 wt. % of the cleaning agent.

4. The detergent composition according to claim 1, wherein the corrosion inhibitor component comprises one or more polyacrylic acid homopolymers having a molecular weight of greater than 10,000 daltons.

5. The detergent composition according to claim 4, wherein the corrosion inhibitor component comprises one or more polyacrylic acid homopolymers having a molecular weight of greater than 50,000 daltons.

6. The detergent composition according to claim 5, wherein the corrosion inhibitor component comprises one or more polyacrylic acid homopolymers having a molecular weight of 70,000 daltons or greater.

7. The detergent composition according to claim 5, wherein the corrosion inhibitor component comprises one or more polyacrylic acid homopolymers having a molecular weight of 100,000 daltons or greater.

8. The detergent composition according to claim 1, wherein the detergent composition comprises greater than 10 wt. % and equal to or less than about 25 wt. % of active corrosion inhibitor component.

9. The detergent composition according to claim 2, wherein the cleaning agent comprises at least one of an anionic surfactant, a nonionic surfactant, a cationic surfactant, or a zwitterionic surfactant.

10. The detergent composition according to claim 1, wherein the alkaline source comprises a metal silicate.

11. The detergent composition according to claim 1 wherein the detergent comprise less than about 0.05% by weight of phosphorous.

* * * * *